US010076840B2

(12) United States Patent
Nakazato

(10) Patent No.: US 10,076,840 B2
(45) Date of Patent: Sep. 18, 2018

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Yusuke Nakazato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 15/087,592

(22) Filed: Mar. 31, 2016

(65) Prior Publication Data

US 2016/0288318 A1 Oct. 6, 2016

(30) Foreign Application Priority Data

Apr. 3, 2015 (JP) .................................. 2015-076869
Dec. 16, 2015 (JP) .................................. 2015-245326

(51) Int. Cl.
*B25J 9/00* (2006.01)
*B25J 9/16* (2006.01)

(52) U.S. Cl.
CPC ... *B25J 9/1666* (2013.01); *G05B 2219/40161* (2013.01); *G05B 2219/40205* (2013.01)

(58) Field of Classification Search
CPC ......... B25J 9/1666; G05B 2219/40161; G05B 2219/40205
See application file for complete search history.

(56) References Cited

U.S. PATENT DOCUMENTS

| 9,278,449 B1* | 3/2016 | Linnell ................... B25J 9/163 |
| 2003/0225479 A1* | 12/2003 | Waled ..................... B25J 9/161 |
| | | 700/245 |
| 2004/0189631 A1* | 9/2004 | Kazi ...................... B25J 9/1671 |
| | | 345/418 |
| 2015/0277398 A1* | 10/2015 | Madvil ................... G05B 13/04 |
| | | 700/97 |
| 2016/0158937 A1* | 6/2016 | Kamoi ................... B25J 9/1697 |
| | | 700/259 |
| 2016/0257000 A1* | 9/2016 | Guerin ................... B25J 9/1605 |

(Continued)

FOREIGN PATENT DOCUMENTS

JP 60-217410 A 10/1985

*Primary Examiner* — Khoi H Tran
*Assistant Examiner* — Robert T Nguyen
(74) *Attorney, Agent, or Firm* — Canon U.S.A., Inc. IP Division

(57) ABSTRACT

To reduce the possibility that a robot will collide with an obstacle during an interference check work and improve the efficiency of the check work at a portion where the interference may occur, an information processing apparatus includes a control unit that controls an operation of a first robot, an acquisition unit that acquires position and orientation of a display apparatus which is attached with a body of an observer, a generation unit that identifies a visual field of the observer including the first robot based on the position and orientation of the display apparatus and an internal parameter of the display apparatus and generate an operation image of a second robot to be displayed in the identified visual field, as an object that may interfere with the first robot, based on operation data of the second robot, and an output unit that outputs the operation image to the display apparatus.

12 Claims, 14 Drawing Sheets

(56) References Cited

U.S. PATENT DOCUMENTS

2017/0120440 A1\* 5/2017 Guerin .................... B25J 9/161
2017/0165841 A1\* 6/2017 Kamoi ................... B25J 9/1697
2017/0203438 A1\* 7/2017 Guerin ................... B25J 9/1605

\* cited by examiner

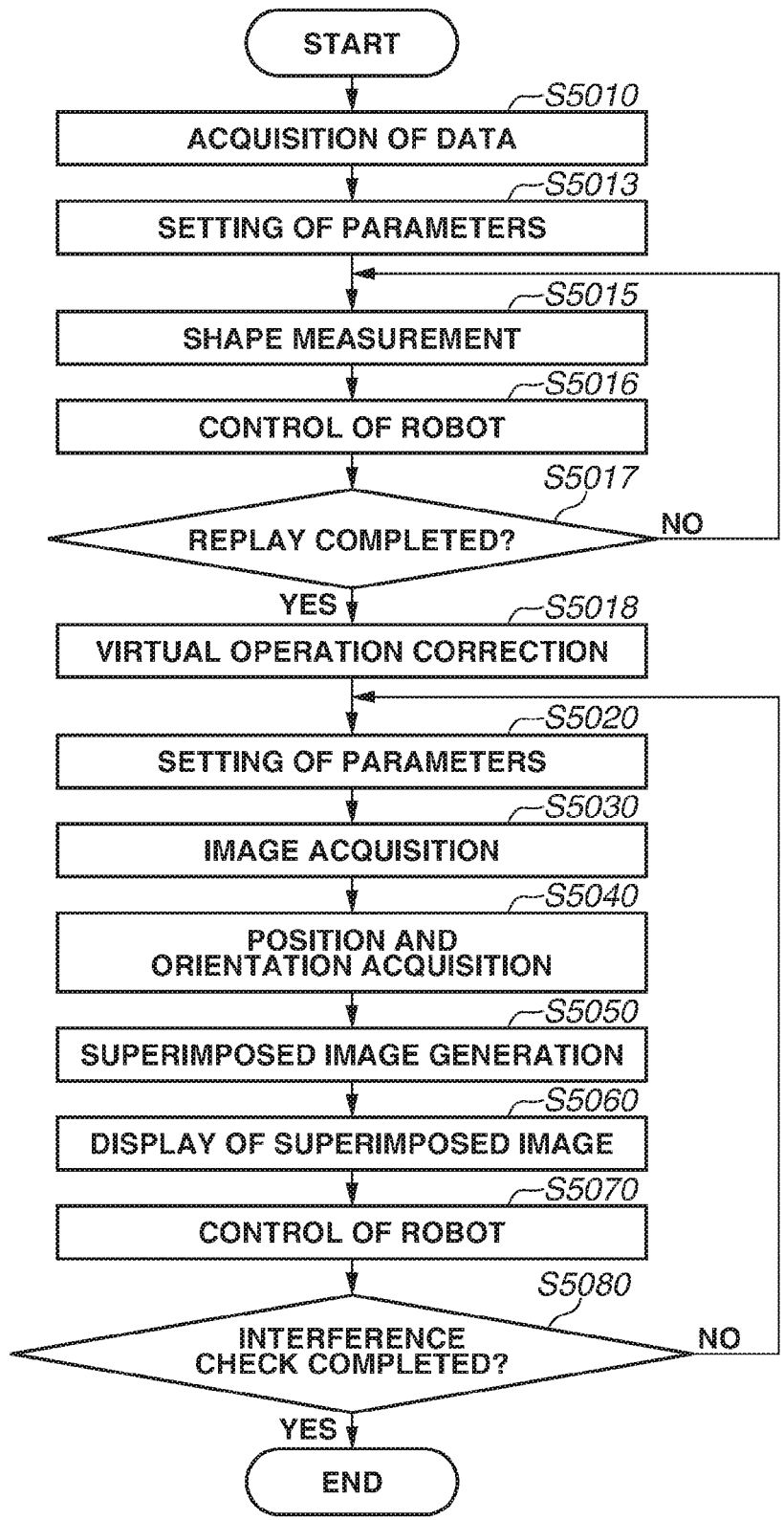

INFORMATION PROCESSING APPARATUS, INFORMATION PROCESSING METHOD, AND PROGRAM

BACKGROUND

Field

Aspects of the present invention generally relate to an information processing apparatus, an information processing method, and a program, which can control a robot.

Description of the Related Art

An industrial robot having a plurality of arms is conventionally used to assemble products automatically in a factory. In this case, it is necessary to teach the robot how to operate appropriately in such a way as to prevent an arm from colliding with anther arm or an object (e.g., a workpiece) existing in a working area. In particular, a great deal of time is required to adjust operation timing to prevent the arms from colliding with each other in the teaching operation. As discussed in Japanese Patent Application No. 60-217410, there is a conventional method for performing the teaching operation by using three-dimensional models of a robot and a workpiece to simulate a robot operation while checking a possible interference. However, accurately checking a possible interference based on only the simulation is not feasible because there are significant differences between the simulation and actual three-dimensional shape and operations of the robot. Therefore, finally checking the presence of any possible interference by causing the robot to perform actual operations based on control data is required.

However, there is a higher possibility that the robot will cause a collision when robot controlling data is replayed by an actual machine in a state where the interference check is insufficient. Further, in a situation that two or more robot arms are positioned intricately and closely by a narrow margin, there will be a case that an observer checks whether the arms interfere with each other by using an actual machine. In such a case, it is difficult to check whether a possible interference portion is really brought into contact with something, because the actual robot itself obstructs the observation.

SUMMARY

An information processing apparatus according to aspects of the present invention include a control unit configured to control an operation of a first robot, an acquisition unit configured to acquire position and orientation of a display apparatus which is attached with a body of an observer, a generation unit configured to identify a visual field of the observer including the first robot based on the position and orientation of the display apparatus and an internal parameter of the display apparatus and generate an operation image of a second robot to be displayed in the identified visual field, as an object that may interfere with the first robot, based on operation data of the second robot, and a display unit configured to cause the display apparatus to display the operation image.

According to aspects of the present invention, it is feasible to reduce the possibility that the robot will collide with an obstacle during an interference check work and improve the efficiency of the check work at a portion where the interference may occur.

Further features of aspects of the present invention will become apparent from the following description of exemplary embodiments with reference to the attached drawings.

BRIEF DESCRIPTION OF THE DRAWINGS

FIG. 14 is a flowchart illustrating an example of information processing that can be performed by the information processing apparatus according to the fifth exemplary embodiment.

DESCRIPTION OF THE EMBODIMENTS

Figure 1:
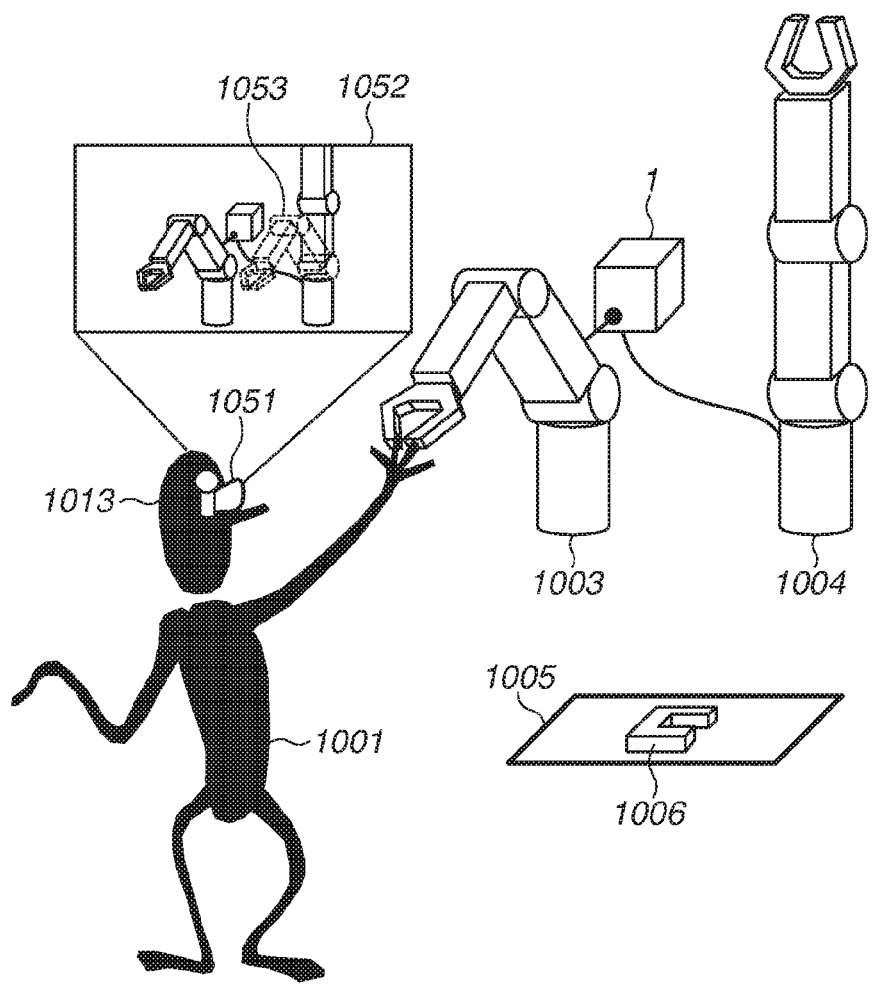
FIG. 1 illustrates an exemplary system configuration of a display system.

Exemplary embodiments will be described in detail below with reference to attached drawings. A first exemplary embodiment provides a method for checking a possible interference of a robot having two arms while reducing the possibility of causing collision between the arms, as described in detail below. FIG. 1 is a schematic view illustrating a display system. As illustrated in FIG. 1, the display system can present an observer 1001 a CG image 1053 superimposed over a scene where a first robot arm 1003 is operating. The CG image 1053 replays an operation of a second robot arm 1004, which can be obtained by using Computer Graphics (CG) technology. Therefore, the observer 1001 can check a possible interference between a robot arm and an obstacle. The possibility of damaging the robot when a robot arm is brought into contact with another robot arm in checking the interference can be reduced. Further, the observer 1001 can visually check a portion where one arm physically obstructs the other arm and may cause any interference between them. As a result, the work efficiency can be improved. The CG image 1053 is an example of an operation image. Further, the first robot arm 1003 according to the present exemplary embodiment is an example of a first robot. Further, the second robot arm 1004 according to the present exemplary embodiment is an example of a second robot. Further, the second robot arm 1004 according to the present exemplary embodiment is an example of a robot arm that may interfere with the first robot arm 1003 according to the present exemplary embodiment.

<System Configuration>

A configuration according to the first exemplary embodiment will be described in detail below with reference to FIG. 1. The display system illustrated in FIG. 1 includes an information processing apparatus 1, the first robot arm 1003, the second robot arm 1004, and a sensor 1013 that can measure the position and orientation of a viewpoint of the observer 1001. Further, the display system includes a camera and a display apparatus 1051 that are disposed at right and left viewpoints of the observer 1001, respectively. The display apparatus 1051 is, for example, a Head Mounted Display (HMD) including a built-in liquid crystal display device. The observer 1001 wears the sensor 1013 and the display apparatus 1051. The display apparatus 1051 is, for example, disposed at the viewpoint of the observer 1001. Further, a target object 1006 is placed on a working area 1005. A scene 1052 is a scene that can be observed by the observer 1001. The CG image 1053 is a CG image representing an operation of the second robot arm 1004.

The information processing apparatus 1 can control the movement of the first robot arm 1003 and can calculate the position and orientation of the viewpoint of the observer 1001 based on a signal from the sensor 1013. The information processing apparatus 1 can identify a visual field of the observer based on the position and orientation of the viewpoint of the observer 1001 and an internal parameter of the display apparatus 1051. Information about the display apparatus 1051 is a parameter representing a projection model of the display apparatus 1051. For example, the information about the display apparatus 1051 includes focal length, resolution, and pixel pitch. The information processing apparatus 1 can generate a CG image representing the operation of the second robot arm 1004 in synchronization with an actual operation of the first robot arm 1003 at a display position of the second robot arm 1004 in the identified visual field.

Further, the information processing apparatus 1 can generate a superimposed image that includes the above-mentioned CG image superimposed on a video acquired by the built-in camera of the display apparatus 1051. The information processing apparatus 1 can transmit the superimposed image to the display apparatus 1051. The display apparatus 1051 can display the superimposed image on the liquid crystal display device thereof. In the present exemplary embodiment, it is assumed that calibration between the observer 1001 and the display apparatus 1051 in viewpoint and orientation can be performed according to the type of the display apparatus 1051.

In the present exemplary embodiment and the following exemplary embodiments, the robot can be any type of robot that includes at least one working portion. The number of robot arms is not limited to a specific number. The working portion of the robot can be a leg or a foot. A plurality of robots can constitute a robot assembly. The robot can be a 6-axis robot or can be a scalar robot or a parallel link robot.

<Hardware Configuration>

Figure 2:
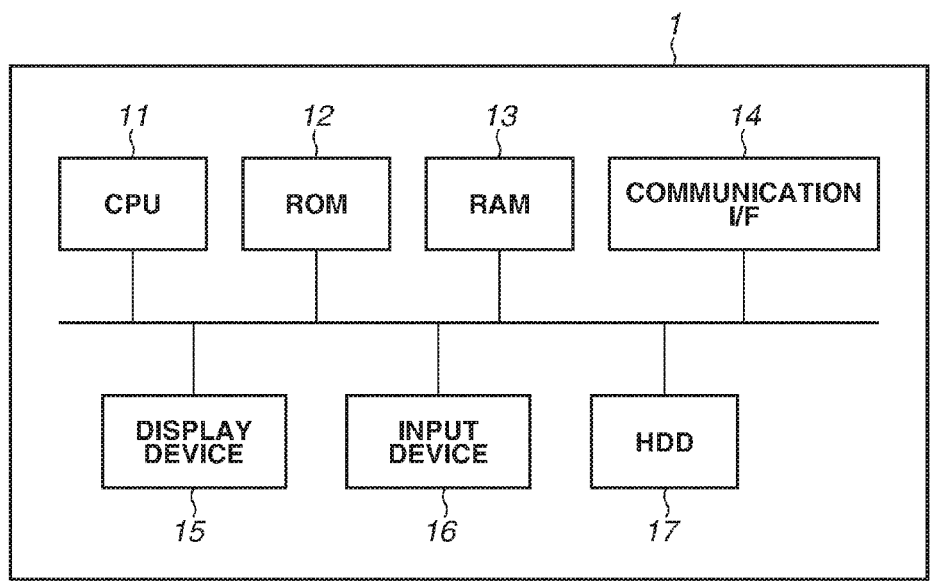
FIG. 2 illustrates an exemplary hardware configuration of an information processing apparatus.

FIG. 2 illustrates an exemplary hardware configuration of the information processing apparatus 1. The information processing apparatus 1 includes a central processing unit (CPU) 11, a read only memory (ROM) 12, a random access memory (RAM) 13, a communication I/F 14, a display device 15, an input device 16, and a hard disk drive (HDD) 17, which cooperatively constitute the hardware configuration. The CPU 11 can control various devices of the information processing apparatus 1 connected via a system bus. The ROM 12 stores a BIOS program and a boot program. The RAM 13 can be used as a main storage device for the CPU 11. The communication I/F 14 can connect the information processing apparatus 1 to a network and can control information communications to be performed via the network. The network can be a wired network or a wireless network, or can be a combination of both wired and wireless networks. The display device 15 can display a result of processing performed by the CPU 11. The input device 16 can accept an input from an operator. For example, the input device 16 can be a mouse or a keyboard, or can be a remote controller described below. The HDD 17 can store an operation system (OS) program and various application programs that can run on the OS.

In the above-mentioned configuration, when the power source of the information processing apparatus 1 is turned on, the CPU 11 runs the boot program stored in the ROM 12 and performs processing according to the OS program loaded into the RAM 13 from the HDD 17 to realize various functions of the information processing apparatus 1. More specifically, a software configuration of the information processing apparatus 1 and processing of flowcharts described below can be realized by the CPU 11 of the information processing apparatus 1 that performs processing based on the programs.

Figure 3:
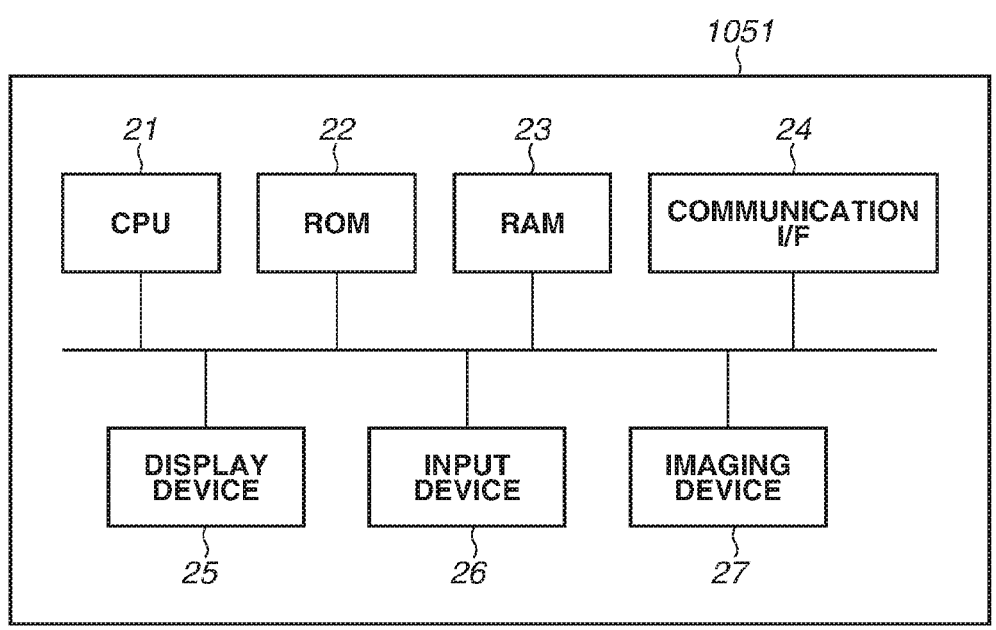
FIG. 3 illustrates an exemplary hardware configuration of a display apparatus.

FIG. 3 illustrates an exemplary hardware configuration of the display apparatus 1051. The display apparatus 1051 includes a CPU 21, a ROM 22, a RAM 23, a communication I/F 24, a display device 25, an input device 26, and an imaging device 27, which cooperatively constitute the hardware configuration. The CPU 21 can control various devices of the display apparatus 1051 connected via a system bus. The ROM 22 stores the OS program and various applications operable according to the OS. The RAM 23 can be used as a main storage device for the CPU 21. The communication I/F 24 can connect the display apparatus 1051 to a network and can control information communications to be performed via the network. The network can be a wired network or a wireless network, or can be a combination of both wired and wireless networks. The display device 25 can display a CG image generated by the information processing apparatus 1. The display device 25 is, for example, a liquid crystal display device. The input device 26 accepts information input by the operator. The imaging device 27 captures an image of a reality space.

In the above-mentioned configuration, when the power source of the display apparatus 1051 is turned on, the CPU 21 performs processing according to a program loaded into the RAM 23 from the ROM 22 to realize various functions of the display apparatus 1051. More specifically, a software configuration of the display apparatus 1051 can be realized by the CPU 21 of the display apparatus 1051 that performs processing based on the programs.

<Software Configuration>

Figure 4:
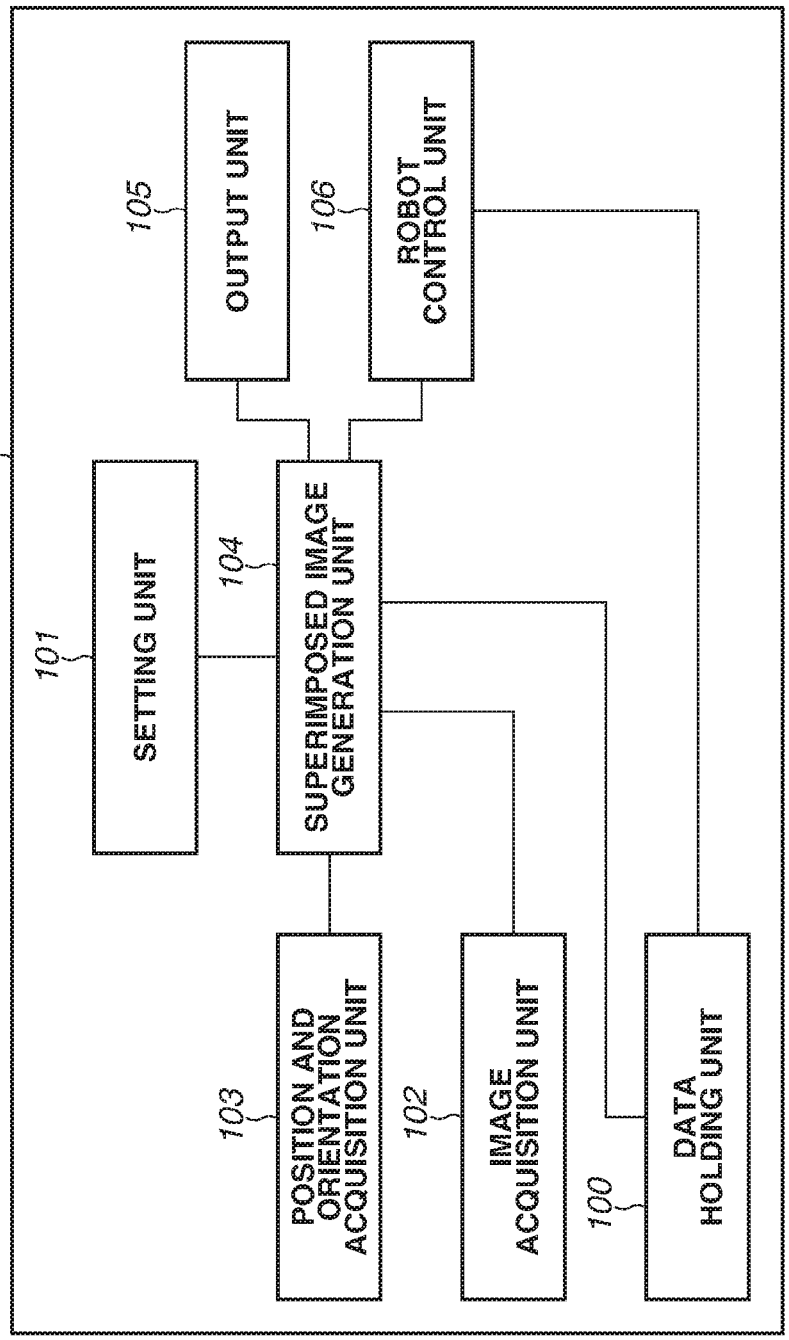
FIG. 4 illustrates a software configuration of the information processing apparatus according to a first exemplary embodiment.

FIG. 4 illustrates an exemplary software configuration of the information processing apparatus 1. The information processing apparatus 1 illustrated in FIG. 4 includes a data holding unit 100, a setting unit 101, an image acquisition unit 102, a position and orientation acquisition unit 103, a superimposed image generation unit 104, an output unit 105, and a robot control unit 106, which cooperatively constitute the software configuration.

The data holding unit 100 can hold three-dimensional shape information about a work environment including a robot, robot controlling data, and robot operation data (hereinafter, referred to as "operation data") in the HDD 17. The three-dimensional shape information about the work environment including the robot is constituted by a three-dimensional shape mesh model, which represents the work environment including the robot, and robot joint information. Alternatively, the three-dimensional shape information can be a model of an analytic curved surface such as a CAD model. The robot controlling data is a list that describes the position of each passing point and action data (such as a robot joint angle or opening/closure of an end effector) at the passing point. However, the robot controlling data can be a list including the position and orientation of the end effector and action data at each passing point. The format of the robot controlling data can be a text format written in a dedicated robot language (e.g., Scripting Language or Programming language). The robot controlling data can be a signal set to be transmitted to the robot. The robot controlling data can be any data capable of replaying a robot operation.

The operation data is constituted by a data list of robot operation data obtained beforehand by measuring an actual operation of the robot, which time-sequentially describes the action (e.g., the robot joint angle or the opening/closure of the end effector). A conventional motion capture technique is usable to acquire the robot operation. However, the operation data can be any type of data representing a robot operation. The operation data can be an arbitrary viewpoint image group or a three-dimensional measurement data group of robot images which are captured time-sequentially with a plurality of imaging apparatuses or a three-dimensional measurement apparatus, and structured.

The setting unit 101 can set a robot arm drawn by the superimposed image generation unit 104 and various parameters (e.g., replay speed and replay position) of a robot operation. In the present exemplary embodiment, the setting unit 101 sets replay information including an arm to be displayed, replay speed, and replay position, according to a setting operation entered via an input apparatus similar to a remote controller of a moving image replay apparatus (e.g., a DVD player). More specifically, in response to a user operation selecting a replay button, the setting unit 101 sets a parameter to start replaying the movements of an actually operated robot and a superimposed image. Further, in response to a user operation selecting a stop button, the setting unit 101 sets a parameter to stop the replay. Further, in response to a user operation selecting a slow replay button or a fast-forwarding button, the setting unit 101 sets a parameter to change the operation speed in the replay. Further, in response to a user operation selecting a channel button, the setting unit 101 may set a parameter to select an arm to be virtually displayed or an arm to be actually operated. The input apparatus to be used in the above-mentioned setting is not limited to the remote controller and can be a mouse, a keyboard, or a touch panel. Further, the setting unit 101 can set a parameter with a button, an operation sequence, or a cursor displayed on the display device 15.

Further, the information processing apparatus 1 can sense a movement of the observer 1001. The setting unit 101 may set a parameter according to a gesture of the observer 1001. The parameters having been set can be displayed on the display device 15 or a display device of the input device 16 (e.g., the remote controller). Further, the setting unit 101 can automatically determine the arm to be virtually displayed or the arm to be actually operated according to a predetermined rule. For example, the setting unit 101 can refer to ID information about each arm in determining the order of the arm to be virtually displayed or the arm to be actually operated.

The image acquisition unit 102 can acquire a video to be presented to the observer 1001 from the built-in camera of the display apparatus 1051 in synchronization with the position and orientation of the viewpoint of the observer 1001 acquired by the position and orientation acquisition unit 103. The image acquired by the image acquisition unit 102 is an example of a captured image.

The position and orientation acquisition unit 103 can acquire the position and orientation of the display apparatus 1051 (that is position and orientation of a viewpoint of the observer 1001). The sensor 1013 illustrated in FIG. 1 is a 6 degree-of-freedom sensor that can measure the position and orientation by measuring a magnetic force generated by a magnetic field generator. The position and orientation acquisition unit 103 acquires the position and orientation of the viewpoint of the observer 1001 based on information obtainable from the sensor 1013.

The superimposed image generation unit 104 can generate the following image based on the position and orientation of the viewpoint acquired by the position and orientation acquisition unit 103, the three-dimensional shape information and the operation data held by the data holding unit 100, and the parameters set by the setting unit 101. More specifically, the superimposed image generation unit 104 identifies the visual field of the observer 1001 based on viewing angle information of the display apparatus 1051 as well as the position and orientation of the viewpoint. Then, the superimposed image generation unit 104 generates an image that replays an operational state of the second robot arm 1004 at a display position of the second robot arm 1004 in the identified visual field. Then, the superimposed image generation unit 104 generates a composite image that includes an image replaying the operation of a robot arm superimposed on the image acquired by the image acquisition unit 102.

In the present exemplary embodiment, the superimposed image generation unit 104 replays the operation data and determines replay position (time) based on the replay information set by the setting unit 101. Further, the superimposed image generation unit 104 draws operational state of the second robot arm 1004 at the replay position. The superimposed image generation unit 104 utilizes, as a drawing viewpoint, the position and orientation of the viewpoint acquired by the position and orientation acquisition unit 103. Further, the superimposed image generation unit 104 utilizes, as a robot shape, a mesh model included in the three-dimensional shape information. The viewing angle information is an example of the internal parameter of the display apparatus.

The output unit 105 can transmit the image generated by the superimposed image generation unit 104 to the display apparatus 1051.

The robot control unit 106 can cause the first robot arm 1003 to operate based on the robot controlling data held by the data holding unit 100 and the parameters set by the setting unit 101. The robot control unit 106 replays the control data and controls the parameters including the joint angle of the first robot arm 1003 based on the parameters set by the setting unit 101 in such a way as to realize the robot arm state at the replay position determined by the superimposed image generation unit 104. If the replay position is located somewhere in between two passing points of the control data, the robot control unit 106 controls the position and orientation of the robot based on values obtainable by interpolating the parameters of these passing points.

Although the present exemplary embodiment has been described with reference to the software configuration illustrated in FIG. 3, the whole or part of the configuration illustrated in FIG. 3 can be replaced by a hardware configuration and can be incorporated into the information processing apparatus 1. Such a replacement is feasible similarly in the following exemplary embodiment.

Figure 5:
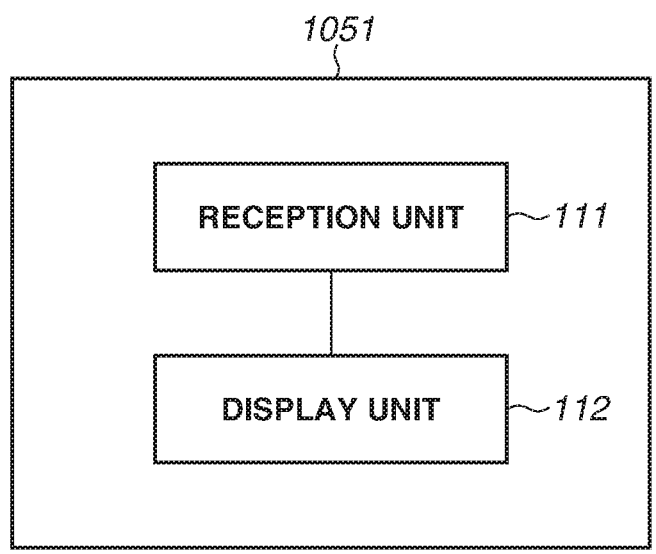
FIG. 5 illustrates an exemplary software configuration of the display apparatus.

FIG. 5 illustrates an exemplary software configuration of the display apparatus 1051. The display apparatus 1051 illustrated in FIG. 5 includes a reception unit 111 and a display unit 112, which cooperatively constitute the software configuration.

The reception unit 111 can receive an image from the information processing apparatus 1. The display unit 112 can cause the display device 25 to display an image received from the reception unit 111. Although the present exemplary embodiment has been described with reference to the software configuration illustrated in FIG. 5, the whole or part of the configuration of the display apparatus 1051 illustrated in FIG. 5 can be replaced by a hardware configuration. Such a replacement is feasible similarly in the following exemplary embodiment.

<Flow of Processing>

Figure 6:
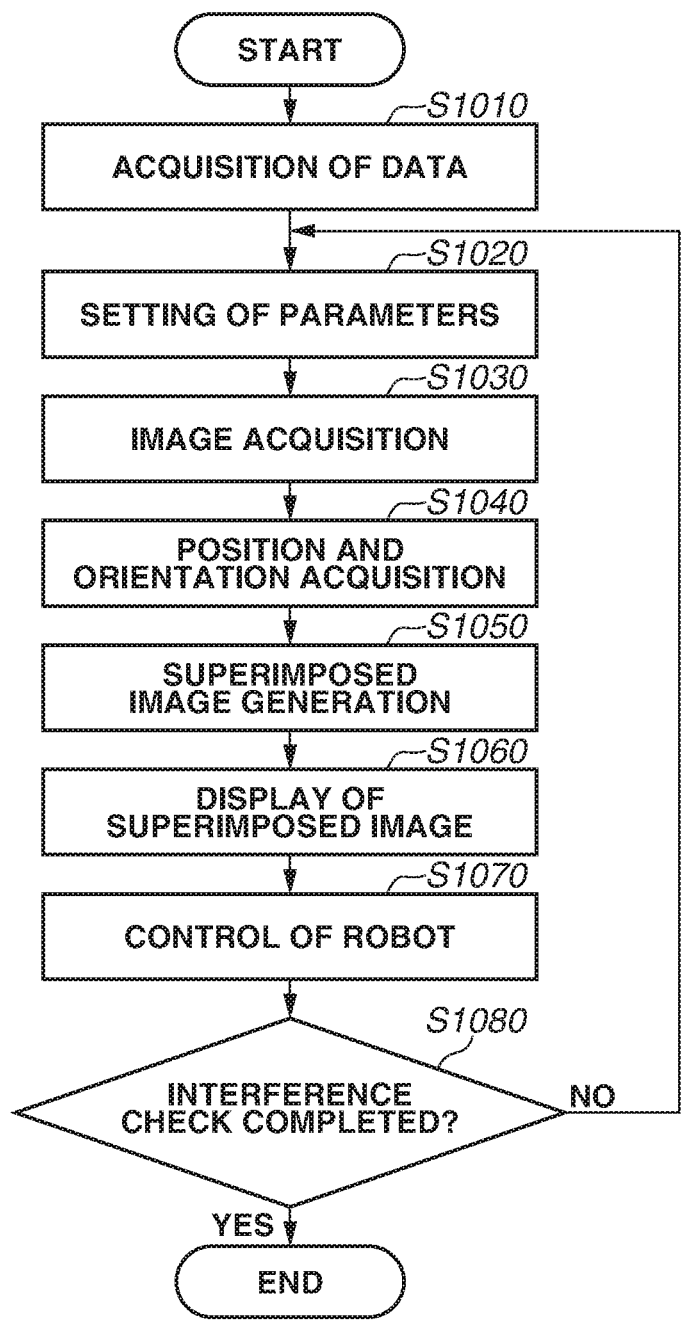
FIG. 6 is a flowchart illustrating an example of information processing that can be performed by the information processing apparatus according to the first exemplary embodiment.

A flow of information processing that can be performed by the information processing apparatus 1 will be described in detail below with reference to a flowchart illustrated in FIG. 6.

In step S1010, the superimposed image generation unit 104 acquires the three-dimensional shape information, the control data, and the operation data (i.e., the data held by the data holding unit 100).

In step S1020, the setting unit 101 selects a robot arm to be drawn by the superimposed image generation unit 104 (and a robot arm actually operated by the robot control unit 106) and sets parameters, such as a replay speed and replay position of the robot. The observer 1001 can set the replay position in such a way as to advance on a frame-by-frame basis, or can designate a desired replay speed to cause the robot to operate continuously in a fast-forwarding or slow replay mode. If it is difficult to check a possible interference, the observer 1001 can temporarily stop the replay position so that observer 1001 can carefully observe the interference from various viewpoints.

In step S1030, the image acquisition unit 102 captures an image of a reality space to be presented to the observer 1001 via the display apparatus 1051.

In step S1040, the position and orientation acquisition unit 103 acquires the position and orientation of the display apparatus 1051 (the position and orientation of the viewpoint of the observer 1001) via the sensor 1013, as information required to generate a superimposed image.

In step S1050, the superimposed image generation unit 104 identifies the visual field of the observer 1001 based on the information acquired or set in steps S1010 to S1040 and generates a superimposed image to be presented to the observer 1001. The superimposed image generation unit 104 outputs the generated superimposed image to the output unit 105 and outputs trigger information (i.e., information required to operate the first robot arm 1003) to the robot control unit 106.

In step S1060, the output unit 105 transmits the superimposed image generated in step S1040 to the display apparatus 1051, for example, via a wireless network.

In step S1070, the robot control unit 106 causes the first robot arm 1003 to operate based on the three-dimensional shape information and the control data acquired in step S1010, the parameters set in step S1020, and the trigger information output in step S1050. Therefore, it is feasible to move the first robot arm 1003 in synchronization with the second robot arm 1004 drawn in the superimposed image. In the present exemplary embodiment, the operation start timing of the first robot arm 1003 is controlled based on the trigger from the superimposed image generation unit 104. However, the operation start control for the first robot arm 1003 is not limited to the above-mentioned example. For example, the observer can manipulate a handy controller for the above-mentioned control.

In step S1080, the setting unit 101 determines whether the interference check has been completed based on a selection operation by the observer 1001. If the setting unit 101 determines that the interference check is not yet completed (NO in step S1080), the operation returns to step S1020. If it is determined that the interference check has been completed (YES in step S1080), the setting unit 101 terminates the processing of the flowchart illustrated in FIG. 6. When the operation returns to step S1020, the observer 1001 observes and checks any possible interference at various viewpoints while changing the position and orientation of the viewpoint and the replay position of the robot operation. The observer 1001 can check if one robot arm interferes with another robot arm or a workpiece (or any other actual environment) while observing an image of the first robot arm 1003 captured by the built-in camera of the HMD on which a CG image of the second robot arm 1004 is superimposed.

<Variations>

In the present exemplary embodiment, the possibility of any interference caused by one arm of a two-arm robot has been checked. However, aspects of the present invention are not limited to the above-mentioned example. For example, it is feasible to check the possibility of any possible interference by switching the virtually displayed CG arm and the actually operated arm. Further, even in a case where the number of robot arms is three or more, the interference check can be performed similarly by switching the order between the virtual displayed arm and the actually operated arm.

The robot can be any type of robot that includes at least one working portion. The working portion of the robot can be a leg (or a foot). The robot can be a 6-axis robot, a scalar robot, or a parallel link robot, or can be a combination of a plurality of robots.

The data holding unit 100 is simply required to hold the three-dimensional shape information about a work environment including the robot, the robot controlling data, and the robot operation data. The three-dimensional shape information can be a model of an analytic curved surface, such as a CAD model. The control data can be a list including the position and orientation of the end effector and action data at each passing point. The format of the control data can be a text format written in a dedicated robot language (e.g., Scripting Language or Programming Language). The control data can be a signal set to be transmitted to the robot. The control data can be any type of information capable of replaying a robot operation. The operation data is not limited to the list of actually measured robot parameters (e.g., the robot joint angle) and can be an arbitrary viewpoint image group or a three-dimensional measurement data group of robot images which are captured time-sequentially with a plurality of imaging apparatuses or a three-dimensional measurement apparatus, and structured. The data held by the data holding unit 100 can be stored in the HDD 17 as described above. However, for example, the data can be stored in a memory of other apparatus that the information processing apparatus 1 can communicate with via a network. Further, in checking the possibility of any interference, it is unnecessary to dispose an actual machine of one arm virtually displayed.

The setting unit 101 can set parameters according to an operation entered via any type of input apparatus if it is usable to set the replay information about the robot operation. The replay information includes information about replay speed and the replay position of virtual displayed and actually operated arms. The observer 1001 can press an appropriate button of the remote controller for the above-mentioned setting and can select a desired replay position with a jog dial. The setting unit 101 can be configured to cause the display device 15 to display the replay information having been set. Further, a CPU of the input apparatus (e.g., the remote controller) can be configured to display the replay information on a display device of the input apparatus. The input apparatus is not limited to the remote controller and can be a mouse or a keyboard, or can be an apparatus capable of analyzing a captured gesture and identifying the meaning of the gesture. Further, the setting unit 101 can be configured to set a parameter according to a setting operation by the observer who presses a button, an operation sequence, or a cursor displayed on the display device 15. For example, the setting unit 101 can be configured to enable the observer 1001 to select a virtually displayed or actually operated arm from a list of names of robot arms displayed on the display device 15 with the input apparatus (e.g., the mouse, the touch panel, or cursor keys). Further, the setting unit 101 can be configured to sense a movement of the observer 1001 and select a robot arm touched or pointed by the observer 1001 as a virtually displayed or actual operated arm.

The image acquisition unit 102 is simply required to acquire a video to be presented to the observer 1001. However, in a case where an optical see-through type display device is used as the display apparatus 1051, the image acquisition unit 102 is not required as part of the software configuration of the information processing apparatus 1. A color camera, a variable density camera, or an infrared camera can be used as the imaging apparatus. Further, the imaging apparatus can be attached to, or may not be attached to, the display apparatus 1051.

Further, in a case where the display apparatus 1051 is a two-dimensional liquid crystal display device, it is feasible for the observer 1001 to perform interference check without changing its own position at various positions and from various directions on a screen of the display device, in a state where a camera having position and orientation acquisition capability is disposed at an arbitrary position.

Any method capable of acquiring the three-dimensional position and orientation of the viewpoint of the observer 1001 is employable for the position and orientation acquisition unit 103. The position and orientation acquisition unit 103 can estimate the position and orientation of the display apparatus 1051 (the viewpoint of the observer) by using the motion capture technique or based on measurement values obtained from a GPS, an orientation sensor, and an acceleration sensor attached to the apparatus that the observer 1001 wears. Further, the position and orientation acquisition unit 103 can be configured to acquire the three-dimensional position and orientation of the display apparatus 1051 (the viewpoint of the observer 1001) according to an image marker method or a method for tracking a feature point extracted from an image acquired by the image acquisition unit 102. Further, in acquiring the position and orientation of the viewpoint, the position and orientation acquisition unit 103 can read the viewpoint position and orientation information or video and sensor data required to calculate the position and orientation of the viewpoint from the HDD 17.

The superimposed image generation unit 104 performs adjustment in such a manner that the coordinates of a virtually displayed robot coincide with the coordinates of the real environment based on the position and orientation of the viewpoint acquired by the position and orientation acquisition unit 103, and generates an image of a robot arm operating at a replay position (time) having been set beforehand. The replay position can be a time corresponding to a case where the replay speed is identical to the acquisition speed of the operation data or can be a time corresponding to a case where the replay is performed at a slower or faster speed having been set beforehand. Further, the replay position can be an arbitrary position set by the setting unit 101. The superimposed image to be displayed can be an image drawn by polygon based on the three-dimensional shape information about the robot or a workpiece or an image drawn by wireframe. Any expression method is usable.

In a case where an optical see-through type display unit is used, the superimposed image generation unit 104 is simply required to generate an image of a robot operating. Further, in a case where a video see-through type display unit is used, the superimposed image generation unit 104 is simply required to generate a composite image including an image of an operating robot superimposed on an image captured by an imaging unit. For example, the information processing apparatus 1 can acquire the information about the display apparatus 1051 (i.e., the optical see-through type or the video see-through type) from the display apparatus 1051 via a wireless network. Alternatively, the setting unit 101 can acquire the information about the display apparatus 1051 according to an operation of the observer 1001. For example, the superimposed image generation unit 104 generates a corresponding superimposed image according to the information about the display apparatus 1051 (i.e., the optical see-through type or the video see-through type).

The output unit 105 can be any type if it can output a superimposed image to the display apparatus 1051. For example, the output unit 105 transmits a superimposed image to the display apparatus 1051 via a wireless network and causes the display apparatus 1051 to display the superimposed image. The display apparatus 1051 can be the optical see-through type or the video see-through type. Further, the display apparatus 1051 can be an HMD, a display device, a projector, a tablet terminal, or a smartphone and can be a display device attached to a teaching pendant of the robot.

The robot control unit 106 is simply required to move a robot arm to the position and orientation of a robot arm reproduced based on the control data, at the same replay position (time) as the superimposed image generation unit 104. In this case, the position and orientation of a robot arm can be defined by the joint angle of each joint of the robot arm.

According to the above-mentioned configuration, the information processing apparatus 1 generates a superimposed image representing an operation of a robot arm with reference to an actual operation locus of a robot arm measured beforehand. Then, the information processing apparatus 1 superimposes the generated superimposed image on a captured image of an actually operating state of the other robot arm. Performing the above-mentioned processing brings a preferable effect in that the observer needs not to worry about the collision of a robot when the interference check is performed in a case where a robot arm causes a delicate movement that cannot be realized by the simulation. Further, the work efficiency can be improved because it is feasible to prevent one robot arm from physically obstructing the other arm in checking the presence of any interference.

In a second exemplary embodiment, an operation for teaching a two-arm robot to perform a predetermined action will be described in detail below. A robot teaching method employed in the present exemplary embodiment is a direct teaching according to which the observer 1001 directly holds and moves a robot arm to input an action to be taught. The observer 1001 performs the direct teaching for each arm and does not actually operate the teaching accomplished robot arm. The information processing apparatus according to the present exemplary embodiment generates an image in such a way as to superimpose an operational simulation image of the teaching accomplished arm in the visual field of the observer 1001 and transmits the generated image to the display apparatus. Therefore, the possibility of causing a collision between the teaching accomplished arm and the observer 1001 or another arm can be reduced. Further, the work efficiency can be improved because it is feasible to prevent the teaching accomplished arm from obstructing in checking the presence of any interference.

<Configuration>

Figure 7:
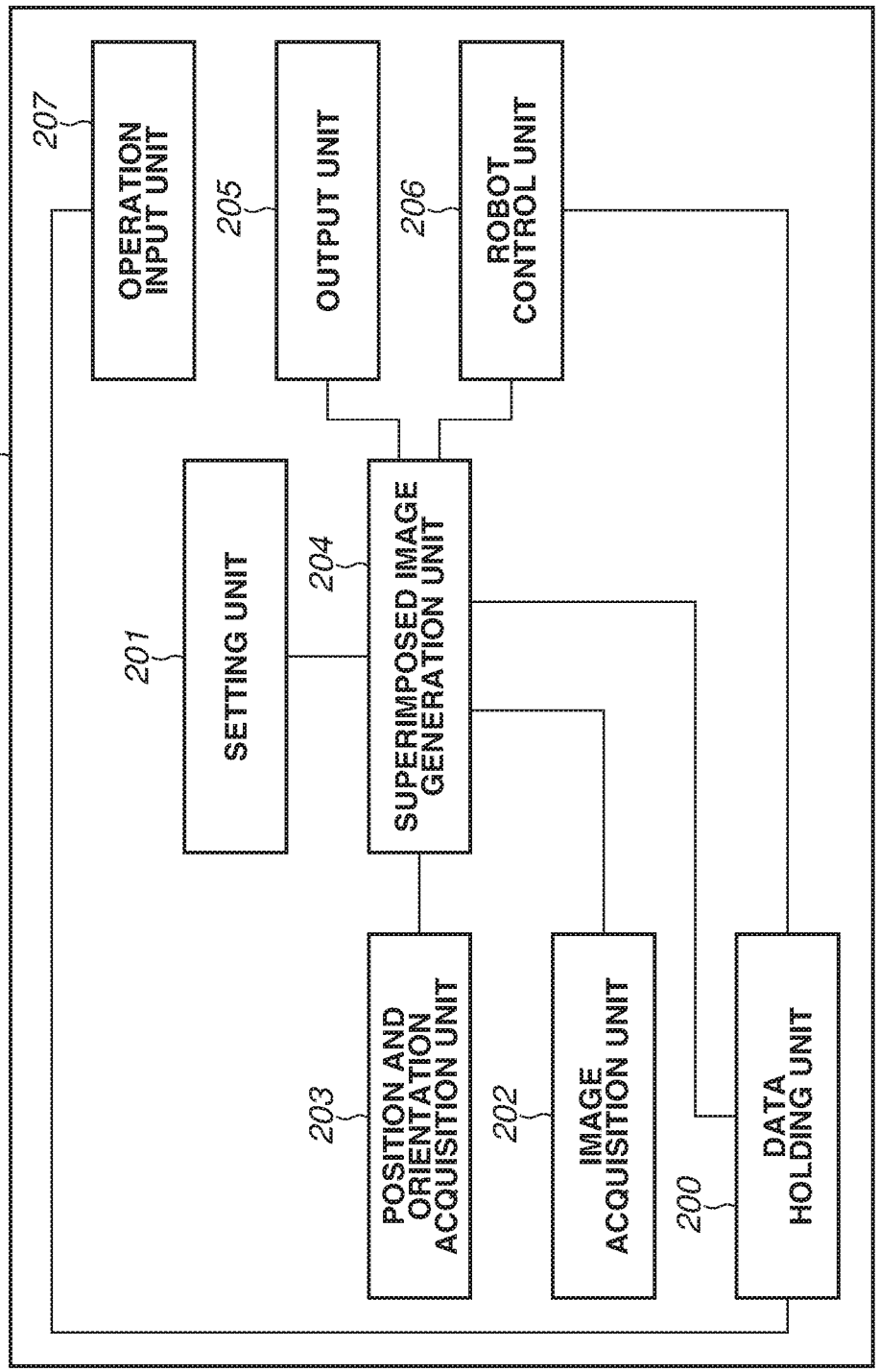
FIG. 7 illustrates a software configuration of an information processing apparatus according to a second exemplary embodiment.

FIG. 7 illustrates a configuration of an information processing apparatus 2 according to the present exemplary embodiment. The information processing apparatus 2 has a hardware configuration similar to that of the information processing apparatus 1 described in the first exemplary embodiment. A robot control unit 206 can control the robot having the first robot arm 1003 and the second robot arm 1004. A data holding unit 200, a setting unit 201, an image acquisition unit 202, a position and orientation acquisition unit 203, a superimposed image generation unit 204, and an output unit 205 are similar to the corresponding units described in the first exemplary embodiment. The information processing apparatus 2 according to the second exemplary embodiment includes an operation input unit 207 in addition to the above-mentioned units. Hereinafter, characteristic features not described in the first exemplary embodiment will be mainly described.

The operation input unit 207 inputs data relating a robot to the information processing apparatus 2 while the observer 1001 performs the direct teaching, namely when the observer 1001 directly holds and moves a robot arm to teach the robot to perform an action. More specifically, the operation input unit 207 can add parameters representing the joint angle and the action of each joint of the robot having been moved, as parameters at each passing point, to the control data. The data holding unit 200 holds the control data.

<Flow of Processing>

Figure 8:
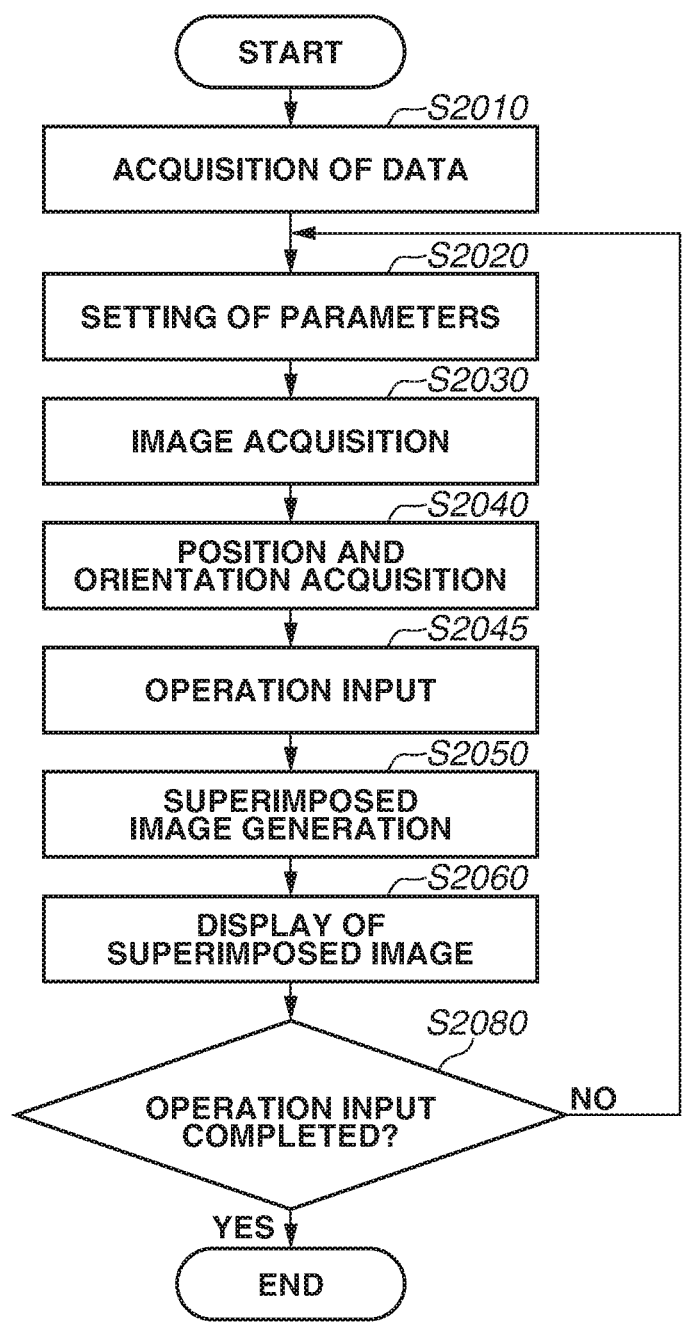
FIG. 8 is a flowchart illustrating an example of information processing that can be performed by the information processing apparatus according to the second exemplary embodiment.

A flow of information processing that can be performed by the information processing apparatus 2 will be described in detail below with reference to a flowchart illustrated in FIG. 8.

Processing to be performed in steps S2010 to S2040 and steps S2050 to S2060 is similar to the processing performed in steps S1010 to S1040 and steps S1050 to S1060 described in the first exemplary embodiment.

In step S2045, the operation input unit 207 generates control data for the actually operated second robot arm 1004 selected in step S2020. The observer 1001 teaches the second robot arm 1004 by direct teaching in such a way as to prevent the second robot arm 1004 from interfering with the first robot arm 1003, while viewing the superimposed image of the first robot arm displayed on the display apparatus 1051.

The operation input unit 207 inputs data obtained when the observer 1001 directly touches and moves the second robot arm 1004 from the position and orientation of the second robot arm 1004 input in one-loop previous step S2045 (or the initial position and orientation of the second robot arm 1004 in an initial loop). More specifically, the operation input unit 207 can add the position and orientation (i.e., the joint angle and action parameters of each joint) of the second robot arm 1004 having been moved, as data of each passing point, to the control data. The data holding unit 200 holds the control data.

In step S2050, the superimposed image generation unit 204 generates an image including an operating state of the first robot arm 1003 to be virtually displayed based on the position and orientation of the viewpoint acquired in step S2040, the three-dimensional robot shape information and the operation data acquired in step S2010, the parameters set in step S2020, and the information relating to the movement of the robot input in step S2045. More specifically, the superimposed image generation unit 204 simulates an operation for moving the second robot arm 1004 having moved in step S2045 from the position and orientation in the one-loop previous step S2045 to the position and orientation input in the present step S2045 and calculates a moving time required for the movement. The superimposed image generation unit 204 generates an image that replays an operation of the first robot arm 1003 at a replay position advanced by the moving time, based on the operation data, with reference to the position and orientation of the first robot arm 1003 virtually displayed in the superimposed image generated in one-loop previous step S2050.

In step S2080, the operation input unit 207 determines whether the direct teaching of the second robot arm 1004 by the observer 1001 has been completed. For example, if there is not any direct teaching operation for a predetermined time, the operation input unit 207 determines that the teaching has been completed. If it is determined that the teaching has been completed (YES in step S2080), the information processing apparatus 2 terminates the processing of the flowchart illustrated in FIG. 8. If the operation input unit 207 determines that the teaching is not yet completed (NO in step S2080), the operation returns to step S2020.

<Variations>

In the present exemplary embodiment, an operation for inputting an action to be performed by one arm of a two-arm robot while checking the possibility of any interference has been described. However, after completing the above-mentioned processing, the observer 1001 can continue the action input operation in a state where the virtually displayed arm and the action input target arm are switched. Further, even in a case where a robot has three or more arms, the observer 1001 can perform a similar action input operation by successively switching the virtually displayed arm and the action input target arm.

The operation input unit 207 can be any type if it can control a robot operation.

The operation input unit 207 can input operational data obtainable when the observer 1001 directly holds and moves a target robot arm as mentioned above.

Further, the operation input unit 207 can input the position of the robot together with the joint angle and the action input by the observer 1001 at each passing point with the teaching pendant. Further, the operation input unit 207 can generate robot controlling data based on a measured operation of the observer 1001. The operation input unit 207 can estimate the position and orientation of an end effector or a gripping object based on measurement data obtainable by observing the movement of the end effector or the gripping object with a camera or a three-dimensional measurement apparatus. Then, the operation input unit 207 can generate robot controlling data based on the estimated position and orientation. Further, if there is any possible interference confirmed through the interference check performed according to the method described in the first or second exemplary embodiment, the observer 1001 can input a robot operation according to the above-mentioned method and can correct the control data. For example, the observer 1001 can designate a passing point of the operation to be corrected and can edit the robot control parameters (e.g., joint angle, position, and action) at the designated passing point with the teaching pendant or a direct teaching computer terminal.

The information processing apparatus can receive a result of the operation edited by the observer 1001 with the teaching pendant or the direct teaching computer terminal and can edit the control data. The control data to be edited can be that for the first robot arm 1003 to be virtually displayed or can be that for the second robot arm 1004 actually operated.

According to the above-mentioned configuration, a teaching operation for a robot having a plurality of arms can be performed smoothly while reducing the possibility that the teaching accomplished arm will be brought into contact with the observer 1001 or another arm. Further, the teaching work efficiency can be improved because the teaching accomplished arm can be prevented from obstructing the interference check.

In a third exemplary embodiment, a configuration for emphasizing a portion where the interference check should be carefully performed and superimposing the emphasized portion on a displayed image in the interference check will be described in detail below. Employing the above-mentioned configuration is useful to improve the work efficiency because the observer needs not perform the interference check at a portion where no interference will occur apparently.

Figure 9:
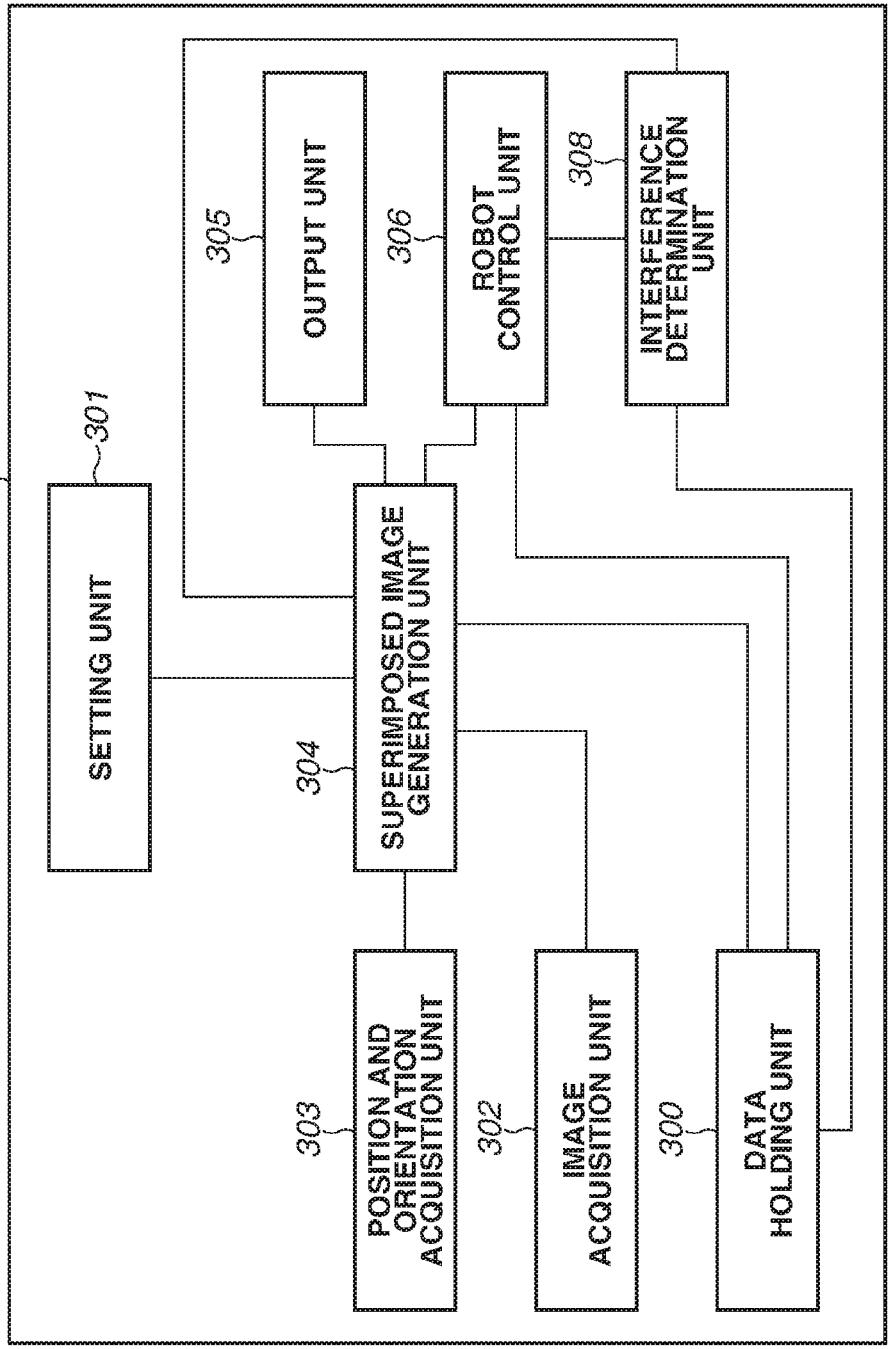
FIG. 9 illustrates a software configuration of an information processing apparatus according to a third exemplary embodiment.

A configuration of an information processing apparatus 3 according to the present exemplary embodiment will be described in detail below with reference to FIG. 9. The information processing apparatus 3 has a hardware configuration similar to that described in the first exemplary embodiment. A robot control unit 306 can control the robot having the first robot arm 1003 and the second robot arm 1004. A data holding unit 300, a setting unit 301, an image acquisition unit 302, a position and orientation acquisition unit 303, a superimposed image generation unit 304, and an output unit 305 are similar to the corresponding units described in the first exemplary embodiment. The information processing apparatus 3 according to the third exemplary embodiment includes an interference determination unit 308 in addition to the above-mentioned units. Hereinafter, characteristic features not described in the first exemplary embodiment will be mainly described.

The interference determination unit 308 determines whether there is a portion where a robot arm interferes with another robot arm and detects the portion where the possibility of interference is higher. More specifically, the interference determination unit 308 simulates an operation of the robot based on a replay position (time) determined with reference to the three-dimensional shape information about the robot arm, the control data, and the operation data held by the data holding unit 300 and the parameters set by the setting unit 301. The interference determination unit 308 simulates a scene at a predetermined replay position. If there is a portion where the distance between robot arms is less than a threshold value having been set beforehand, the interference determination unit 308 determines that the interference may occur and detects a possible interference portion.

<Flow of Processing>

Figure 10:
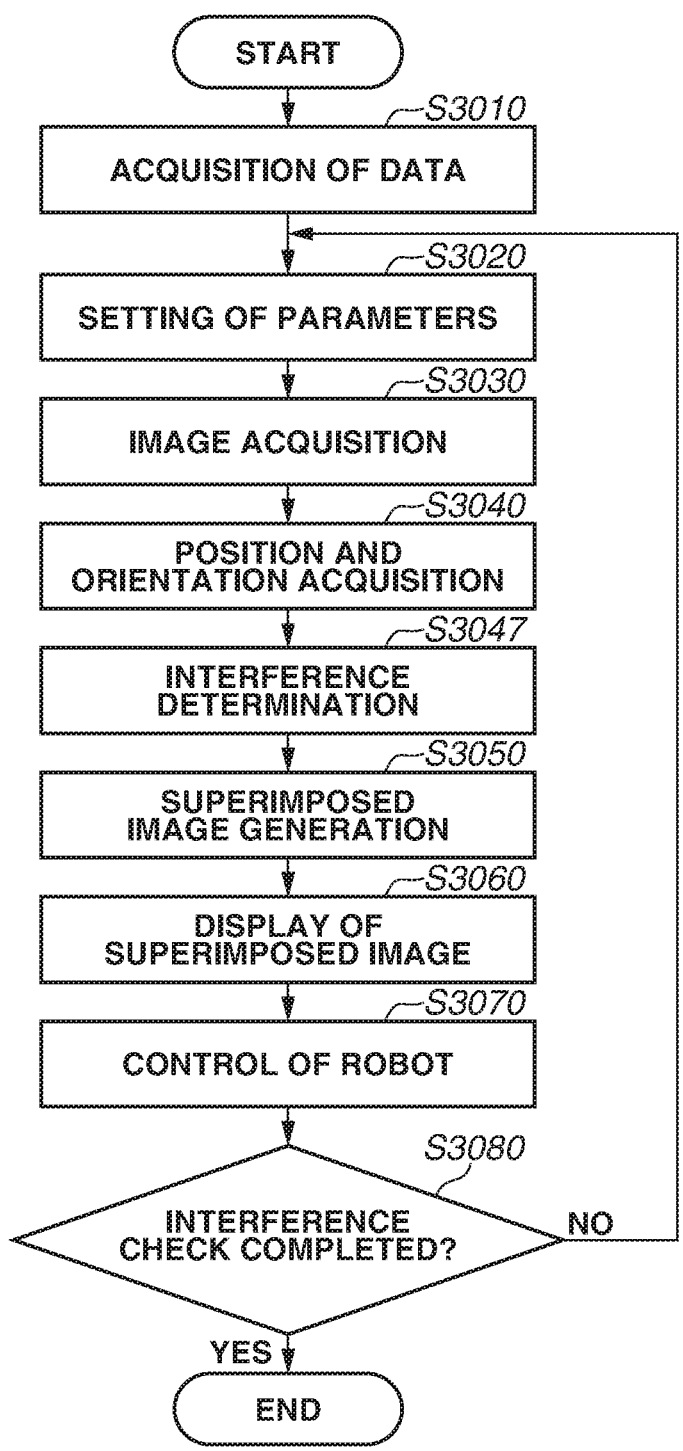
FIG. 10 is a flowchart illustrating an example of information processing that can be performed by the information processing apparatus according to the third exemplary embodiment.

A flow of information processing that can be performed by the information processing apparatus 3 will be described in detail below with reference to a flowchart illustrated in FIG. 10.

Processing to be performed in steps S3010 to S3040 and steps S3050 to S3080 is similar to the processing performed in steps S1010 to S1040 and steps S1050 to S1080 described in the first exemplary embodiment.

In step S3047, the interference determination unit 308 determines whether there is a portion where a robot arm is brought into contact with another robot arm and detects a possible interference portion. More specifically, the interference determination unit 308 simulates an operation of the second robot arm 1004 to be virtually displayed based on the three-dimensional shape and the operation data held by the data holding unit 300. Further, the interference determination unit 308 simulates an operation of the first robot arm 1003 actually operated based on the three-dimensional shape and the control data and performs interference determination. The interference determination unit 308 performs a robot simulation at a replay position advanced by the replay speed set by the setting unit 301 from the position and orientation of the robot at the one-loop previous replay position. Then, if there is a portion where the distance between the robot arm and a workpiece or a working space is equal to or less than a threshold value having been determined beforehand, the interference determination unit 308 determines that an interference may occur at the identified portion and detects it as a possible interference portion.

In step S3050, the superimposed image generation unit 304 generates an image including an operating state of the second robot arm 1004 to be virtually displayed based on the position and orientation of the viewpoint acquired in step S3040, the three-dimensional shape information and the operation data acquired in step S3010, and the parameters set in step S3020. Further, the superimposed image generation unit 304 generates an image by emphasizing the possible contact portion detected in step S3047. More specifically, the superimposed image generation unit 304 displays a red-colored three-dimensional shape model of the robot in the vicinity of the detected portion.

<Variations>

The interference determination unit 308 is simply required to simulate an operation of a robot based on three-dimensional information and operation data of the robot and detect a possible interference portion. For example, the interference determination unit 308 is not required to use a simulation result of the actually operated first robot arm 1003. The interference determination unit 308 can be configured to perform interference determination with reference to a three-dimensional measurement result of the actually operated first robot arm 1003 and a simulation result of the second robot arm 1004 to be virtually displayed. For example, it is useful to cause the first robot arm 1003 of the robot reproduced at a predetermined replay position to move actually and three-dimensionally measure a working space including the robot with a three-dimensional measurement apparatus installed in the environment.

The interference determination unit 308 can be configured to detect a portion where the distance from the second robot arm 1004 to be virtually displayed, which is reproduced based on the acquired three-dimensional measurement data, the operation data, and the three-dimensional shape information, becomes equal to or less than a predetermined threshold value as an possible interference portion. Further, in determining a possible interference portion, the interference determination unit 308 can refer to a predetermined distance or an inclusion relation relating to the three-dimensional shape. Further, the interference determination unit 308 can be configured to generate notification with sound when a possible interference portion is detected.

To realize the emphasized display of a possible interference portion, the superimposed image generation unit 304 can generate any image if the emphasized portion can be discriminated clearly. The superimposed image generation unit 304 can change the color of a possible interference portion or flicker it in an image to be generated. Further, the superimposed image generation unit 304 can generate an image including a possible interference portion indicated by an arrow or surrounded by a semitransparent sphere or a rectangular parallelepiped, or accompanied by a sentence.

Further, the information processing apparatus 3 can be configured to include the operation input unit described in the second exemplary embodiment, so that the observer can input and correct the control data while checking the presence of a possible interference.

According to the above-mentioned configuration, the work efficiency can be improved because the observer needs not perform the interference check at a portion where no interference will occur apparently.

In a fourth exemplary embodiment, it is assumed that three-dimensional shape information prepared to generate a robot operation image does not match the actual shapes of the robot, the peripheral devices, and the work environment. In this case, the information processing apparatus three-dimensionally measures the robot, the peripheral devices, and the work environment and generates the robot operation image based on the measured three-dimensional shape information. Employing the above-mentioned configuration is useful to improve the work efficiency because the observer can accurately perform interference check while observing the operation image reflecting the actually measured three-dimensional shapes of the robot, the peripheral devices, and the work environment.

Figure 11:
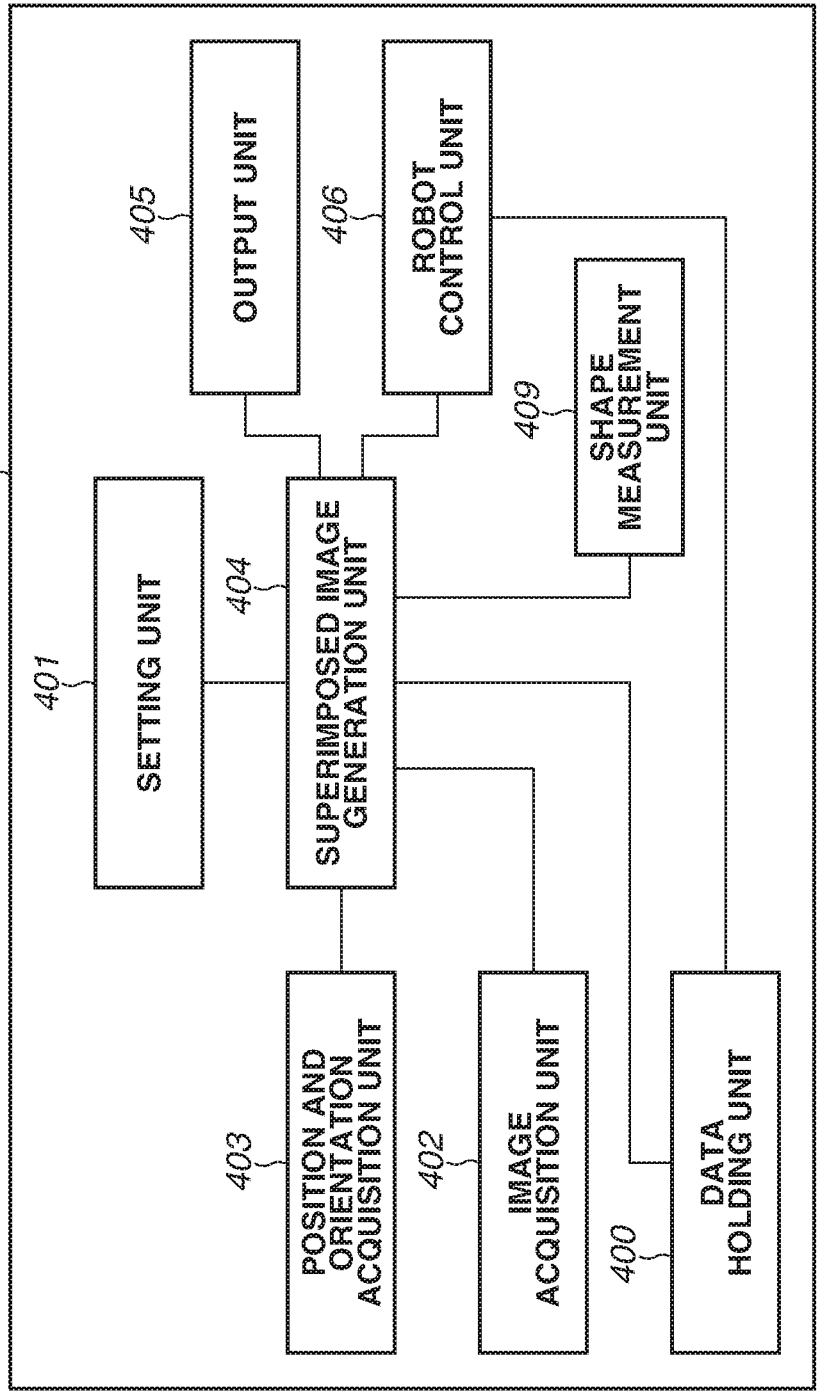
FIG. 11 illustrates a software configuration of an information processing apparatus according to a fourth exemplary embodiment.

FIG. 11 illustrates an exemplary software configuration of an information processing apparatus 4 according to the present exemplary embodiment. The information processing apparatus 4 has a hardware configuration similar to that described in the first exemplary embodiment. In addition, the information processing apparatus 4 includes a measurement apparatus (not illustrated) capable of measuring three-dimensional shapes of the robot, the peripheral devices, and the environment. In the present exemplary embodiment, the measurement apparatus is an RGBD camera that is capable of simultaneously capturing a color image and a distance image. A robot control unit 406 can control the robot having the first robot arm 1003 and the second robot arm 1004. A data holding unit 400, a setting unit 401, an image acquisition unit 402, a position and orientation acquisition unit 403, a superimposed image generation unit 404, and an output unit 405 are similar to the corresponding units described in the first exemplary embodiment. The information processing apparatus 4 includes a shape measurement unit 409, as part of the software configuration, in addition to the above-mentioned units. Hereinafter, characteristic features not described in the first exemplary embodiment will be mainly described.

The shape measurement unit 409 uses the measurement apparatus to perform measurement and acquires actual three-dimensional shape information about the robot, the peripheral devices (e.g., a cable and a jig to be used in the work), and the work environment. In the present exemplary embodiment, the shape measurement unit 409 causes the measurement apparatus to move and acquire color images and distance images of the robot, the peripheral devices, and the work environment measured from various viewpoints. The information processing apparatus 4 extracts features from the acquired color images and the distance images and calculates the position and orientation of the imaging viewpoint by performing matching. Further, the information processing apparatus 4 generates colored three-dimensional point group from respective color images and distance images and performs integration and meshing of the generated three-dimensional point group in the same coordinate system.

Through the above-mentioned operations, the information processing apparatus 4 generates three-dimensional shape information about the robot, the peripheral devices, and the work environment. Further, the information processing apparatus 4 performs positioning between the generated three-dimensional shape information and three-dimensional shape information held by the data holding unit 400. Further, the information processing apparatus 4 adjusts the coordinate system of the generated three-dimensional shape information to the coordinate system of the robot three-dimensional shape information held by the data holding unit 400. In this case, the information processing apparatus 4 performs mapping and positioning for each movable portion if the three-dimensional shape includes operation data relating to the robot.

<Flow of Processing>

Figure 12:
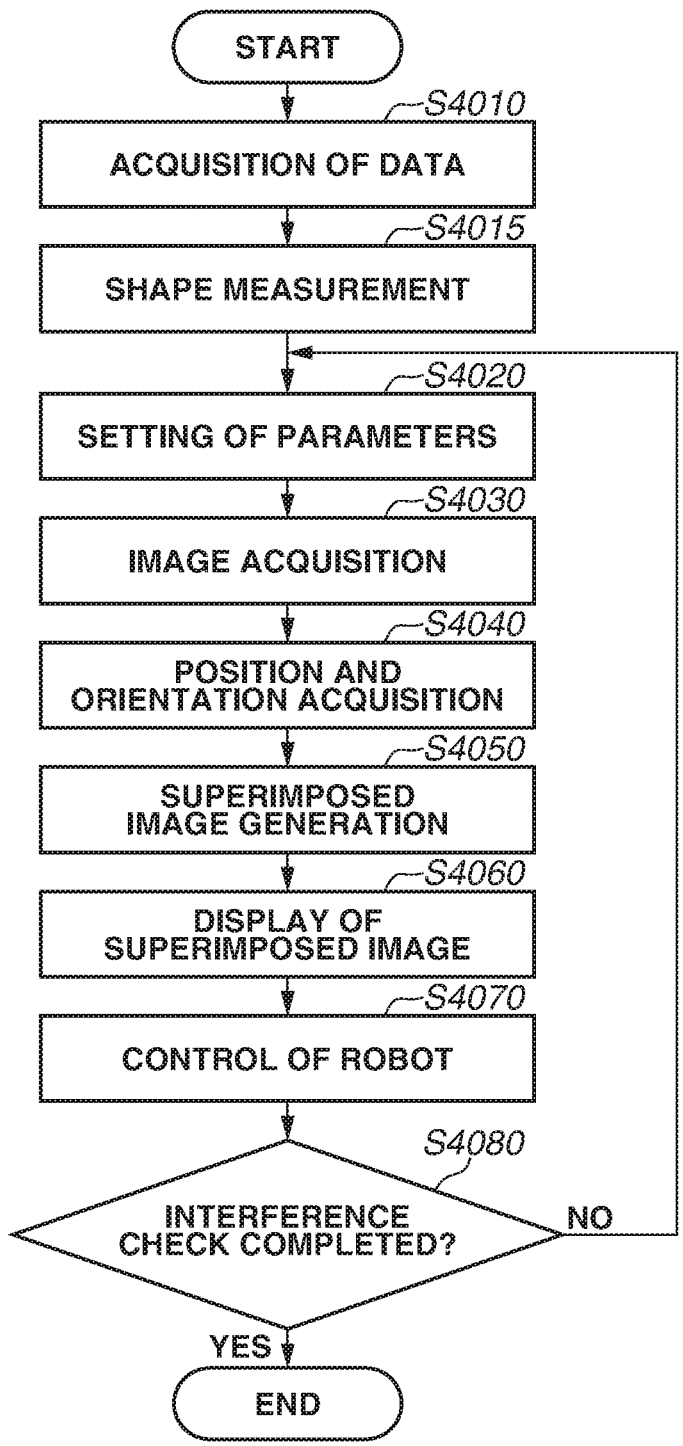
FIG. 12 is a flowchart illustrating an example of information processing that can be performed by the information processing apparatus according to the fourth exemplary embodiment.

A flow of information processing that can be performed by the information processing apparatus 4 will be described in detail below with reference to a flowchart illustrated in FIG. 12.

Processing to be performed in step S4010 and steps S4020 to S4080 is similar to the processing performed in step S1010 and steps S1020 to S1080 described in the first exemplary embodiment.

In step S4015, the shape measurement unit 409 acquires actual three-dimensional shape information obtainable by measuring the robot, the peripheral devices, and the work environment. The processing to be performed in step S4015 is an example of three-dimensional shape information acquisition processing.

In step S4050, the superimposed image generation unit 404 generates an image including an operating state of the second robot arm 1004 to be virtually displayed based on the following data. More specifically, the superimposed image generation unit 404 generates a virtual image to be displayed based on the position and orientation of the viewpoint acquired in step S4040, the operation data acquired in step S4010, the three-dimensional shape information acquired in step S4015, and the parameters set in step S4020.

<Variations>

The shape measurement unit 409 is simply required to acquire actual three-dimensional shape information about the robot, the peripheral devices, and the work environment. The shape measurement unit 409 can use an RGBD camera, a ToF sensor, or a stereo camera to measure a three-dimensional shape. Further, the shape measurement unit 409 can use a combination of a plurality of pieces of three-dimensional shape information measured from a plurality of viewpoints by using a single movable measurement apparatus or a plurality of stationary measurement apparatuses. It is useful to perform calibration beforehand with respect to imaging position and orientation for the plurality of measurement apparatuses. The three-dimensional shape information can be a three-dimensional point group, an assembly of surface elements (Surfel), a mesh model, or a CAD model. The three-dimensional shape information can include texture information. Further, a combination of the measured three-dimensional shape information and the three-dimensional shape information held by the data holding unit can be used.

The configuration described in the present exemplary embodiment is similar to that described in the first exemplary embodiment. However, the configuration described in the present exemplary embodiment can be combined with the configuration described in the second or third exemplary embodiment. More specifically, the information processing apparatus 4 can use the three-dimensional shape information measured by the shape measurement unit 409, instead of using the three-dimensional shape information held by the data holding unit, to bring the effects described in the second or third exemplary embodiment.

The robot control unit 406 controls the operations of the robot and the peripheral devices based on the robot controlling data held by the data holding unit 400 and the parameters set by the setting unit 401. For example, if there is any possibility that the robot and the peripheral devices will be brought into contact with the work environment measured by the shape measurement unit 409 during their operations, the robot control unit 406 can change the operation data of the robot and the peripheral devices in such a way as to eliminate the possibility of contact.

According to the above-mentioned configuration, the information processing apparatus 4 generates a superimposed image including operating states of the robot arm and the peripheral devices based on the actually measured three-dimensional shape information about the robot, the peripheral devices, and the work environment. Then, the information processing apparatus 4 superimposes the generated superimposed image on an image including the other robot arm actually operating. Performing the above-mentioned processing brings an effect that the interference check can be accurately performed because three-dimensional shapes of the robot, the peripheral devices, and the work environment, which have not been reproduced by preliminary simulation, can be reflected to the simulation and the superimposed image. As a result, the work efficiency can be improved.

Three-dimensional shape information and operations prepared to generate a robot operation image may not match the actual shapes and operations of the robot, the peripheral devices, and the work environment. Therefore, the information processing apparatus according to a fifth exemplary embodiment measures the three-dimensional shape and the operations of the robot, the peripheral devices, and the work environment, and generates the robot operation image based on the measured three-dimensional shape information and operations. Employing the above-mentioned configuration is useful to improve the work efficiency because the observer can accurately perform interference check while observing the operation image reflecting the actually measured three-dimensional shape and operations of the robot, the peripheral devices, and the work environment.

Figure 13:
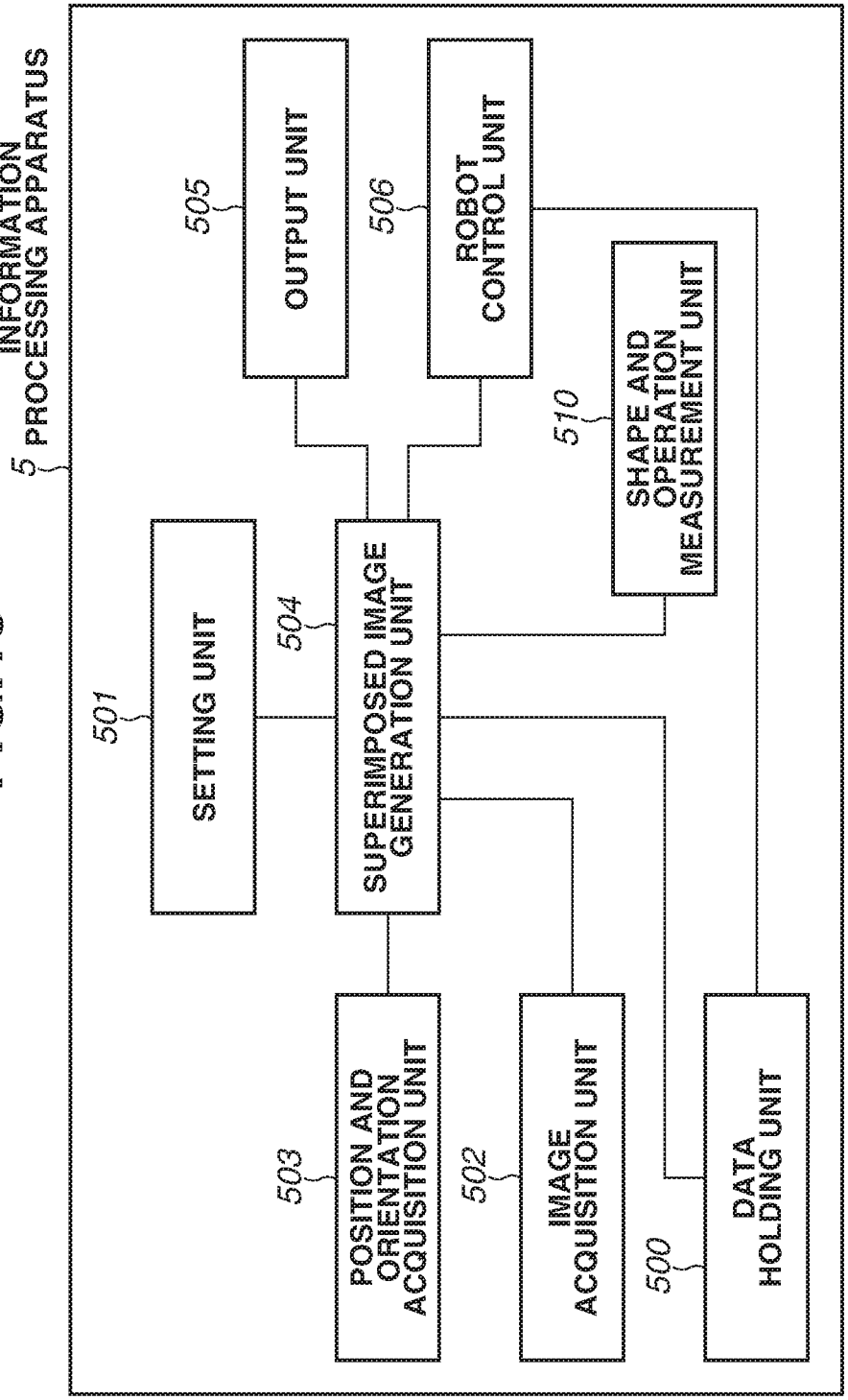
FIG. 13 illustrates a software configuration of an information processing apparatus according to a fifth exemplary embodiment.

FIG. 13 illustrates an exemplary software configuration of an information processing apparatus 5 according to the present exemplary embodiment. The information processing apparatus 5 has a hardware configuration similar to that described in the fourth exemplary embodiment. A robot control unit 506 can control the robot having the first robot arm 1003 and the second robot arm 1004. A data holding unit 500, a setting unit 501, an image acquisition unit 502, a position and orientation acquisition unit 503, a superimposed image generation unit 504, and an output unit 505 are similar to the corresponding units described in the fourth exemplary embodiment. The information processing apparatus 5 includes a shape and operation measurement unit 510, as part of the software configuration, in addition to the above-mentioned units. Hereinafter, characteristic features not described in the fourth exemplary embodiment will be mainly described.

The shape and operation measurement unit 510 according to the present exemplary embodiment measures and acquires actual three-dimensional shape information and operation information about the robot, the peripheral devices (e.g., cables and jigs used in the work), and the work environment by using a measurement apparatus (not illustrated). In the present exemplary embodiment, the measurement apparatus is constituted by a plurality of RGBD cameras. It is assumed that calibration between the plurality of RGBD cameras in position and orientation is performed beforehand and known already. The RGBD cameras are synchronized with each other to measure the robot, the peripheral devices, and the work environment from a plurality of viewpoints.

In the measurement, the robot control unit 506 controls the operations of the robot and the peripheral devices (e.g., jigs) based on the operation data held by the data holding unit 500. The information processing apparatus 5 generates a colored three-dimensional point group based on the color images and the distance images obtained through the measurement. Each measurement viewpoint position is known beforehand through preliminary calibration. Therefore, the information processing apparatus 5 successively acquires a three-dimensional point group integrating a plurality of three-dimensional point groups as three-dimensional shape information. The information processing apparatus 5 successively repeats the above-mentioned operations until the sequential operation terminates. The information processing apparatus 5 acquires time-sequentially arranged three-dimensional shape information as three-dimensional shape information and operation information.

<Flow of Processing>

A flow of information processing that can be performed by the information processing apparatus 5 will be described in detail below with reference to a flowchart illustrated in FIG. 14.

Processing to be performed in step S5010 and steps S5020 to S5080 is similar to the processing performed in step S1010 and steps S1020 to S1080 described in the first exemplary embodiment.

In step S5013, the setting unit 501 sets parameters, such as replay speed and replay position, of the robot.

In step S5015, the shape and operation measurement unit 510 successively acquires actual three-dimensional shape information about the robot, the peripheral devices, and the work environment by performing measurement. The processing to be performed in step S5015 is an example of shape and operation acquisition processing.

In step S5016, the robot control unit 506 controls the operations of the robot and the peripheral devices (e.g., jigs used in the work) based on the three-dimensional shape information and the control data acquired in step S5010, and the parameters set in step S5013.

In step S5017, the shape and operation measurement unit 510 determines whether the replay of sequential operations of the robot and the peripheral devices has been completed. If the shape and operation measurement unit 510 determines that the replay is not yet completed (NO in step S5017), the operation returns to step S5015. If the shape and operation measurement unit 510 determines that the replay has been completed (YES in step S5017), the operation proceeds to step S5018.

In step S5018, the shape and operation measurement unit 510 converts the three-dimensional shape information successively acquired in step S5015 into a three-dimensional moving image and holds the converted data as robot operation data. The shape and operation measurement unit 510 can cause the data holding unit 500 to hold the three-dimensional moving image as the robot operation data.

In step S5050, the superimposed image generation unit 504 generates an image. More specifically, the superimposed image generation unit 504 generates an image including an operating state of the second robot arm 1004 to be virtually displayed with reference to the position and orientation of the viewpoint acquired in step S5040, the operation data acquired in step S5010, the three-dimensional moving image acquired in step S5018, and the parameters set in step S5020.

<Variations>

The shape and operation measurement unit 510 is simply required to acquire actual three-dimensional shape information and operation information about the robot, the peripheral devices, and the work environment. The shape and operation measurement unit 510 can use an RGBD camera, a ToF sensor, or a stereo camera to measure a three-dimensional shape. Further, the shape and operation measurement unit 510 can use a combination of a plurality of pieces of three-dimensional shape information measured from a plurality of viewpoints by using a plurality of measurement apparatus. It is useful to perform calibration beforehand with respect to imaging position and orientation for the plurality of measurement apparatuses. The three-dimensional shape information can be a three-dimensional point group, an assembly of surface elements (Surfel), a mesh model, or a CAD model. The three-dimensional shape information can include texture information. Further, a combination of the measured three-dimensional shape information and the three-dimensional shape information held by the data holding unit can be used.

The operation data can be a three-dimensional moving image obtainable by arranging the above-mentioned three-dimensional shape information time-sequentially. It is useful to convert the time-sequentially arranged three-dimensional shape information acquired by the shape and operation measurement unit 510 into robot controlling data by adjusting it to the three-dimensional shape information (e.g., three-dimensional shape model of the robot and joint information) held by the data holding unit. The superimposed image generation unit 504 can generate an image including an operating state of the second robot arm 1004 to be virtually displayed based on the three-dimensional shape information acquired by the shape and operation measurement unit 510 and the converted control data.

The robot control unit 506 controls the operations of the robot and the peripheral devices based on the robot controlling data held by the data holding unit 500 and the parameters set by the setting unit 501. The setting unit 501 can change the replay speed for the robot and the peripheral devices. For example, if there is any possibility that the robot and peripheral devices will be brought into contact with the work environment measured by the shape and operation measurement unit 510 during their operation, the robot control unit 406 can change the operation data of the robot and the peripheral devices in such a way as to eliminate the possibility of the undesired contact. Then, the shape and operation measurement unit 510 can measure the changed operations.

Although the present exemplary embodiment has been described with reference to the configuration similar to that described in the first exemplary embodiment, the present exemplary embodiment can be combined with the second or third exemplary embodiment. More specifically, the effects of the second or third exemplary embodiment can be obtained by using the three-dimensional shape information and the operation information measured by the shape and operation measurement unit 510, instead of using the three-dimensional shape information held by the data holding unit.

According to the above-mentioned configuration, the information processing apparatus 5 generates a superimposed image including operating states of the robot arm and the peripheral devices based on the actually measured three-dimensional shape information and operation information about the robot, the peripheral device, and the work environment. Then, the information processing apparatus 5 superimposes the generated superimposed image on an image including the other robot arm actually operating. Performing the above-mentioned processing brings an effect that the interference check can be accurately performed because three-dimensional shapes and operations of the robot, the peripheral devices, and the work environment, which have not been reproduced by preliminary simulation, can be reflected to the simulation and the superimposed image. As a result, the work efficiency can be improved.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although aspects of the present invention have been described with reference to preferred exemplary embodiments, the aspects of the present invention are not limited to only the described exemplary embodiments.

According to the above-mentioned exemplary embodiments, the possibility that a robot will collide with an obstacle during a teaching work can be reduced and the teaching work efficiency can be improved.

While aspects of the present invention have been described with reference to exemplary embodiments, it is to be understood that the aspects of invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-076869, filed Apr. 3, 2015, and No. 2015-245326, filed Dec. 16, 2015, which are hereby incorporated by reference herein in their entirety.

What is claimed is:

1. A non-transitory computer-readable storage medium storing computer executable instructions that cause a computer execute an information processing method, the information processing method comprising:
controlling an operation of a first robot;
acquiring a captured moving image of a real operation of the first robot;
acquiring a position and orientation of a viewpoint of an observer;
generating a moving image of a virtual operation of a second robot that may interfere with the first robot, to be observed by the observer, based on operation data of the second robot and the position and orientation of the viewpoint of the observer;
generating a composited moving image by compositing the captured moving image of the real operation of the first robot with the generated moving image of a virtual operation of the second robot; and
outputting the composited moving image to the a display apparatus.

2. An information processing method for an information processing apparatus, the method comprising:
controlling an operation of a first robot;
acquiring a captured moving image of a real operation of the first robot;
acquiring a position and orientation of a viewpoint of an observer;
generating a moving image of a virtual operation of a second robot that may interfere with the first robot, to be observed by the observer, based on operation data of the second robot and the position and orientation of the viewpoint of the observer;
generating a composited moving image by compositing the captured moving image of the real operation of the first robot with the generated moving image of a virtual operation of the second robot; and
outputting the composited moving image to a display apparatus.

3. An information processing apparatus, comprising:
at least one memory configured to store a program; and
at least one processor configured to execute the program stored in the memory to function as:
a control unit configured to control an operation of a first robot;
an image acquisition unit configured to acquire a captured moving image of a real operation of the first robot which is controlled by the control unit;
a position and orientation acquisition unit configured to acquire a position and orientation of a viewpoint of an observer;
a generation unit configured to generate a moving image of a virtual operation of a second robot that may interfere with the first robot, to be observed by the observer, based on operation data of the second robot and the position and orientation of the viewpoint of the observer;
a composition unit configured to generate a composited moving image by compositing the captured moving image of the real operation of the first robot with the generated moving image of a virtual operation of the second robot; and
an output unit configured to output the composited moving image to a display apparatus.

4. The information processing apparatus according to claim 3, wherein an operation of the second robot is synchronous with the operation of the first robot controlled by the control unit.

5. The information processing apparatus according to claim 3, further comprising:
a shape information acquisition unit configured to acquire three-dimensional shape information about the second robot and a peripheral device,
wherein the generation unit is configured to generate the operation image of the second robot based on the operation data of the second robot and the three-dimensional shape information.

6. The information processing apparatus according to claim 3, further comprising:
a shape and operation acquisition unit configured to acquire three-dimensional shape information and operation information about the second robot and a peripheral device;
wherein the generation unit is configured to generate the operation image of the second robot based on the three-dimensional shape information and the operation information.

7. The information processing apparatus according to claim 3, wherein the generation unit is configured to generate the operation image of the second robot to be displayed at a locating position of the second robot in the identified visual field.

8. The information processing apparatus according to claim 3, wherein the generation unit is configured to generate the operation image of the second robot in synchronization with the control of the operation of the first robot.

9. The information processing apparatus according to claim 3, wherein the control unit controls the operation of the first robot based on control data, and
wherein the at least one processor is further configured to function as a correction unit configured to correct the control data.

10. The information processing apparatus according to claim 3, further comprising:
an operation input unit configured to input actual movement data of the second robot,
wherein the generation unit is configured to generate the operation image of the second robot with reference to the actual movement data as the operation data of the second robot.

11. The information processing apparatus according to claim 3, further comprising:

an interference determination unit configured to perform an operational simulation for the first robot and an operational simulation for the second robot and determine whether there is a specific portion at which a distance between the first robot and the second robot becomes less than or equal to a predetermined threshold value.

12. The information processing apparatus according to claim 11, wherein the generation unit is configured to generate the operation image of the second robot that includes an emphasized display of the specific portion if the interference determination unit identifies the specific portion.

* * * * *